(12) United States Patent
Chiang et al.

(10) Patent No.: US 12,556,687 B2
(45) Date of Patent: Feb. 17, 2026

(54) METHOD AND APPARATUS OF COMBINED PREDICTION IN VIDEO CODING SYSTEM

(71) Applicant: MEDIATEK INC., Hsinchu (TW)

(72) Inventors: Man-Shu Chiang, Hsinchu (TW); Chih-Wei Hsu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 18/864,748

(22) PCT Filed: Mar. 14, 2024

(86) PCT No.: PCT/CN2024/081632
§ 371 (c)(1),
(2) Date: Nov. 11, 2024

(87) PCT Pub. No.: WO2024/193431
PCT Pub. Date: Sep. 26, 2024

(65) Prior Publication Data
US 2025/0317553 A1    Oct. 9, 2025

Related U.S. Application Data

(60) Provisional application No. 63/490,807, filed on Mar. 17, 2023.

(51) Int. Cl.
*H04N 7/12* (2006.01)
*H04N 19/105* (2014.01)
(Continued)

(52) U.S. Cl.
CPC ......... *H04N 19/105* (2014.11); *H04N 19/154* (2014.11); *H04N 19/176* (2014.11); *H04N 19/196* (2014.11)

(58) Field of Classification Search
CPC .................................................. H04N 19/105
See application file for complete search history.

(56) References Cited

U.S. PATENT DOCUMENTS

2022/0182643 A1    6/2022    Bae

FOREIGN PATENT DOCUMENTS

| WO | 2017144017 A1 | 8/2017 |
|----|---------------|--------|
| WO | 2020187329 A1 | 9/2020 |
| WO | 2021093801 A1 | 5/2021 |

OTHER PUBLICATIONS

International Search Report and Written Opinion dated Jun. 4, 2024, issued in application No. PCT/CN2024/081632.

(Continued)

*Primary Examiner* — Y Lee
(74) *Attorney, Agent, or Firm* — McClure, Qualey & Rodack, LLP

(57) ABSTRACT

A method and apparatus for video coding using combined prediction. According to this method, a combined predictor is derived, wherein the combined predictor comprises a weighted combination of one or more source terms. One or more weightings for the weighted combination of one or more source terms are derived using a regression technique based on relationship estimation based on one or more templates. The one or more source terms correspond to different prediction modes for the current block and the different prediction modes comprise at least one non-intra mode. Or, the one or more source terms correspond to member samples in a pattern determined associated with a to-be-predicted sample for the current block and each member sample corresponds to an initial predicted sample of combining prediction mode. The current block is encoded or decoded using information comprising the combined predictor.

18 Claims, 7 Drawing Sheets

(51) Int. Cl.
*H04N 19/154* (2014.01)
*H04N 19/176* (2014.01)
*H04N 19/196* (2014.01)

(56) References Cited

OTHER PUBLICATIONS

Dias, A.S., et al.; "CE10: CIIP using explicit signaling of weights (CE10-1.2);" Joint Video Experts Team (JVET) of ITU-T SG 16 WP 3 and ISO/IEC JTC 1/SC 29/WG 11; Mar. 2019; pp. 1-5.

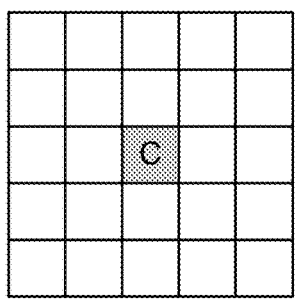
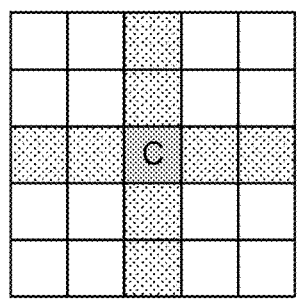
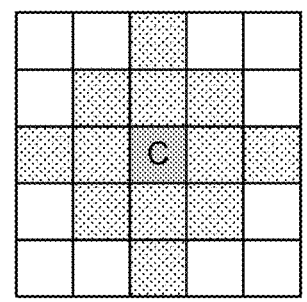
*Fig. 10A*  *Fig. 10B*  *Fig. 10C*
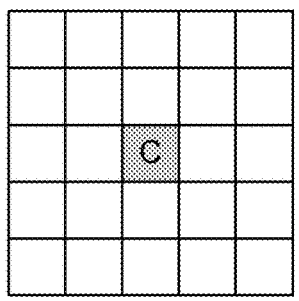
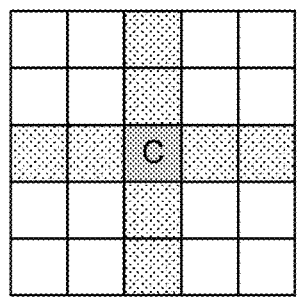
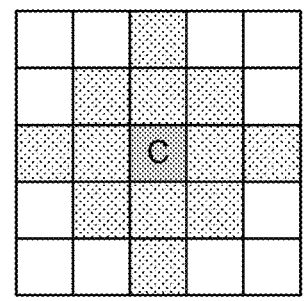
*Fig. 11A*  *Fig. 11B*  *Fig. 11C*
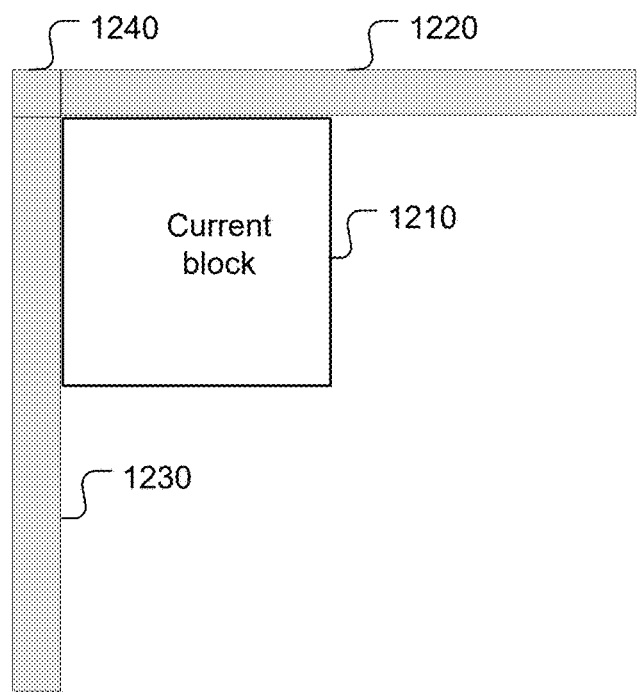
*Fig. 12*

METHOD AND APPARATUS OF COMBINED PREDICTION IN VIDEO CODING SYSTEM

CROSS REFERENCE TO RELATED APPLICATIONS

The present invention is a non-Provisional Application of and claims priority to U.S. Provisional Patent Application No. 63/490,807, filed on Mar. 17, 2023. The U.S. Provisional Patent Application is hereby incorporated by reference in its entirety.

FIELD OF THE INVENTION

The present invention relates to video coding system. In particular, the present invention relates to combined prediction by using regression based technique to determine weighting to improve performance of intra or inter prediction coding.

BACKGROUND AND RELATED ART

Versatile video coding (VVC) is the latest international video coding standard developed by the Joint Video Experts Team (JVET) of the ITU-T Video Coding Experts Group (VCEG) and the ISO/IEC Moving Picture Experts Group (MPEG). The standard has been published as an ISO standard: ISO/IEC 23090-3:2021, Information technology—Coded representation of immersive media—Part 3: Versatile video coding, published February 2021. VVC is developed based on its predecessor HEVC (High Efficiency Video Coding) by adding more coding tools to improve coding efficiency and also to handle various types of video sources including 3-dimensional (3D) video signals.

FIG. 1A illustrates an exemplary adaptive Inter/Intra video encoding system incorporating loop processing. For Intra Prediction, the prediction data is derived based on previously coded video data in the current picture. For Inter Prediction 112, Motion Estimation (ME) is performed at the encoder side and Motion Compensation (MC) is performed based on the result of ME to provide prediction data derived from other picture(s) and motion data. Switch 114 selects Intra Prediction 110 or Inter-Prediction 112 and the selected prediction data is supplied to Adder 116 to form prediction errors, also called residues. The prediction error is then processed by Transform (T) 118 followed by Quantization (Q) 120. The transformed and quantized residues are then coded by Entropy Encoder 122 to be included in a video bitstream corresponding to the compressed video data. The bitstream associated with the transform coefficients is then packed with side information such as motion and coding modes associated with Intra prediction and Inter prediction, and other information such as parameters associated with loop filters applied to underlying image area. The side information associated with Intra Prediction 110, Inter prediction 112 and in-loop filter 130, are provided to Entropy Encoder 122 as shown in FIG. 1A. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, in-loop filter 130 is often applied to the reconstructed video data before the reconstructed video data are stored in the Reference Picture Buffer 134 in order to improve video quality. For example, deblocking filter (DF), Sample Adaptive Offset (SAO) and Adaptive Loop Filter (ALF) may be used. The loop filter information may need to be incorporated in the bitstream so that a decoder can properly recover the required information. Therefore, loop filter information is also provided to Entropy Encoder 122 for incorporation into the bitstream. In FIG. 1A, Loop filter 130 is applied to the reconstructed video before the reconstructed samples are stored in the reference picture buffer 134. The system in FIG. 1A is intended to illustrate an exemplary structure of a typical video encoder. It may correspond to the High Efficiency Video Coding (HEVC) system, VP8, VP9, H.264 or VVC.

The decoder, as shown in FIG. 1B, can use similar or portion of the same functional blocks as the encoder except for Transform 118 and Quantization 120 since the decoder only needs Inverse Quantization 124 and Inverse Transform 126. Instead of Entropy Encoder 122, the decoder uses an Entropy Decoder 140 to decode the video bitstream into quantized transform coefficients and needed coding information (e.g. ILPF information, Intra prediction information and Inter prediction information). The Intra prediction 150 at the decoder side does not need to perform the mode search. Instead, the decoder only needs to generate Intra prediction according to Intra prediction information received from the Entropy Decoder 140. Furthermore, for Inter prediction, the decoder only needs to perform motion compensation (MC 152) according to Inter prediction information received from the Entropy Decoder 140 without the need for motion estimation.

According to VVC, an input picture is partitioned into non-overlapped square block regions referred as CTUs (Coding Tree Units), similar to HEVC. Each CTU can be partitioned into one or multiple smaller size coding units (CUs). The resulting CU partitions can be in square or rectangular shapes. Also, VVC divides a CTU into prediction units (PUs) as a unit to apply prediction process, such as Inter prediction, Intra prediction, etc.

Partitioning of the CTUs Using a Tree Structure

In VVC, a quadtree with nested multi-type tree using binary and ternary splits segmentation structure replaces the concepts of multiple partition unit types, i.e. it removes the separation of the CU, PU and TU concepts except as needed for CUs that have a size too large for the maximum transform length, and supports more flexibility for CU partition shapes. In the coding tree structure, a CU can have either a square or rectangular shape. A coding tree unit (CTU) is first partitioned by a quaternary tree (a.k.a. quadtree) structure. Then the quaternary tree leaf nodes can be further partitioned by a multi-type tree structure. In most cases, the CU, PU and TU have the same block size in the quadtree with nested multi-type tree coding block structure. The exception occurs when maximum supported transform length is smaller than the width or height of the colour component of the CU.

In VVC, the coding tree scheme supports the ability for the luma and chroma to have a separate block tree structure. For P and B slices, the luma and chroma CTBs in one CTU have to share the same coding tree structure. However, for I slices, the luma and chroma can have separate block tree structures. When the separate block tree mode is applied, luma CTB is partitioned into CUs by one coding tree structure, and the chroma CTBs are partitioned into chroma CUs by another coding tree structure. This means that a CU in an I slice may consist of a coding block of the luma component or coding blocks of two chroma components, and a CU in a P or B slice always consists of coding blocks of all three colour components unless the video is monochrome.

Intra Mode Coding with 67 Intra Prediction Modes

To capture the arbitrary edge directions presented in natural video, the number of directional intra modes in VVC is extended from 33, as used in HEVC, to 65.

In VVC, several conventional angular intra prediction modes are adaptively replaced with wide-angle intra prediction modes for the non-square blocks.

To keep the complexity of the most probable mode (MPM) list generation low, an intra mode coding method with 6 MPMs is used by considering two available neighbouring intra modes. The following three aspects are considered to construct the MPM list:

Default intra modes
Neighbouring intra modes
Derived intra modes.

Secondary MPM lists is introduced as described in JVET-D0114 (Seregin, et al., "Block shape dependent intra mode coding", Joint Video Exploration Team (JVET) of ITU-T SG 16 WP 3 and ISO/IEC JTC 1/SC 29/WG 11, 4th Meeting: Chengdu, CN, 15-21 Oct. 2016, Document JVET-D0114). The existing primary MPM (PMPM) list consists of 6 entries and the secondary MPM (SMPM) list includes 16 entries. A general MPM list with 22 entries is constructed first, and then the first 6 entries in this general MPM list are included into the PMPM list, and the rest of entries form the SMPM list. The first entry in the general MPM list is the Planar mode. The remaining entries are composed of the intra modes of the left (L), above (A), below-left (BL), above-right (AR), and above-left (AL) neighbouring blocks as shown in the following, the directional modes with added offset from the first two available directional modes of neighbouring blocks, and the default modes.

Decoder Side Intra Mode Derivation (DIMD)

When DIMD is applied, multiple intra modes (for example, mode 1 and mode 2 suggested by DIMD derivation process) are derived from the reconstructed neighbour samples, and those two predictors are combined with the planar mode predictor with the weights derived from the gradients. The DIMD mode is used as an alternative prediction mode and is always checked in the high-complexity RDO mode.

To implicitly derive the intra prediction modes of a blocks, a texture gradient analysis is performed at both the encoder and decoder sides. This process starts with an empty Histogram of Gradient (HoG) with 65 entries, corresponding to the 65 angular modes. Amplitudes of these entries are determined during the texture gradient analysis.

In the first step, DIMD picks a template of T=3 columns and lines from respectively left side and above side of the current block. This area is used as the reference for the gradient based intra prediction modes derivation.

In the second step, the horizontal and vertical Sobel filters are applied on all 3×3 window positions, centred on the pixels of the middle line of the template. At each window position, Sobel filters calculate the intensity of pure horizontal and vertical directions as $G_x$ and $G_y$, respectively. Then, the texture angle of the window is calculated as:

$$\text{angle} = \arctan(G_x/G_y), \quad (1)$$

which can be converted into one of 65 angular intra prediction modes. Once the intra prediction mode index of current window is derived as idx, the amplitude of its entry in the HoG[idx] is updated by addition of:

$$ampl = |G_x| + |G_y| \quad (2)$$

FIGS. 2A-C show an example of HoG, calculated after applying the above operations on all pixel positions in the template. FIG. 2A illustrates an example of selected template 220 for a current block 210. Template 220 comprises T lines above the current block and T columns to the left of the current block. For intra prediction of the current block, the area 230 at the above and left of the current block corresponds to a reconstructed area and the area 240 below and at the right of the block corresponds to an unavailable area. FIG. 2B illustrates an example for T=3 and the HoGs are calculated for pixels 260 in the middle line and pixels 222 in the middle column. For example, for pixel 252, a 3×3 window 250 is used. FIG. 2C illustrates an example of the amplitudes (ampl) calculated based on equation (2) for the angular intra prediction modes as determined from equation (1).

Once HoG is computed, if two intra prediction modes are derived, the indices with two tallest histogram bars are selected as the two implicitly derived intra prediction modes for the block and are further combined with the Planar mode as the prediction of DIMD mode. The prediction fusion is applied as a weighted average of the above three predictors. To this aim, the weight of planar is fixed to 21/64 (~⅓). The remaining weight of 43/64 (~⅔) is then shared between the two HoG IPMs, proportionally to the amplitude of their HoG bars. FIG. 3 illustrates an example of the blending process. As shown in FIG. 3, two intra modes (M1 312 and M2 314) are selected according to the indices with two tallest bars of histogram bars 310. The three predictors (340, 342 and 344) are used to form the blended prediction. The three predictors correspond to applying the M1, M2 and planar intra modes (320, 322 and 324 respectively) to the reference pixels 330 to form the respective predictors. The three predictors are weighted by respective weighting factors (ω1, ω2 and ω3) 350. The weighted predictors are summed using adder 352 to generated the blended predictor 360. Note that, if only one mode (i.e., single mode) exists in the histogram, then no blending process, and no second DIMD mode.

Besides, the two implicitly derived intra modes are included into the MPM list so that the DIMD process is performed before the MPM list is constructed. The primary derived intra mode of a DIMD block is stored with a block and is used for MPM list construction of the neighbouring blocks.

Template-Based Intra Mode Derivation (TIMD)

Template-based intra mode derivation (TIMD) mode implicitly derives the intra prediction mode of a CU using a neighbouring template at both the encoder and decoder, instead of signalling the intra prediction mode to the decoder. As shown in FIG. 4, the prediction samples of the template (412 and 414) for the current block 410 are generated using the reference samples (420 and 422) of the template for each candidate mode. A cost is calculated as the SATD (Sum of Absolute Transformed Differences) between the prediction samples and the reconstruction samples of the template. The intra prediction mode with the minimum cost is selected as the DIMD mode and used for intra prediction of the CU. The candidate modes may be 67 intra prediction modes as in VVC or extended to 131 intra prediction modes. In general, MPMs can provide a clue to indicate the directional information of a CU. Thus, to reduce the intra mode search space and utilize the characteristics of a CU, the intra prediction mode can be implicitly derived from the MPM list.

For each intra prediction mode in MPMs, the SATD (TIMD cost) between the prediction and reconstruction samples of the template is calculated. First two intra prediction modes with the minimum SATD are selected as the TIMD modes suggested by TIMD derivation process. These two TIMD modes are fused with weights after applying PDPC process, and such weighted intra prediction is used to code the current CU. Position dependent intra prediction combination (PDPC) is included in the derivation of the TIMD modes.

The costs of the two selected modes are compared with a threshold, in the test, the cost factor of 2 is applied as follows:

$$costMode2 < 2 * costMode1.$$

If this condition is true, the fusion is applied, otherwise only model is used (i.e., single mode case). Weights of the modes are computed from their SATD costs as follows:

$$weight1 = costMode2/(costMode1 + costMode2)$$
$$weight2 = 1 - weight1.$$

Template Matching Prediction (TMP)

Template matching prediction (TMP) is a special intra prediction mode that copies the best prediction block from the reconstructed part of the current frame, whose L-shaped template matches the current template.

CCLM (Cross Component Linear Model)

The main idea behind CCLM mode (sometimes abbreviated as LM mode) is as follows: chroma components of a block can be predicted from the collocated reconstructed luma samples by linear models whose parameters are derived from already reconstructed luma and chroma samples that are adjacent to the block.

In VVC, the CCLM mode makes use of inter-channel dependencies by predicting the chroma samples from reconstructed luma samples. This prediction is carried out using a linear model in the form $$P(i, j) = a \cdot rec'_L(i, j) + b. \quad (3)$$

Here, P(i, j) represents the predicted chroma samples in a CU and $rec_L'(i, j)$ represents the reconstructed luma samples of the same CU which are down-sampled for the case of non-4:4:4 colour format. The model parameters a and b are derived based on reconstructed neighbouring luma and chroma samples at both encoder and decoder side without explicit signalling.

Three CCLM modes, i.e., CCLM_LT, CCLM_L, and CCLM_T, are specified in VVC. These three modes differ with respect to the locations of the reference samples that are used for model parameter derivation. Samples only from the top boundary are involved in the CCLM_T mode and samples only from the left boundary are involved in the CCLM_L mode. In the CCLM_LT mode, samples from both the top boundary and the left boundary are used.

MMLM Overview

As indicated by the name, the original CCLM mode employs one linear model for predicting the chroma samples from the luma samples for the whole CU, while in MMLM (Multiple Model CCLM), there can be two models. In MMLM, neighbouring luma samples and neighbouring chroma samples of the current block are classified into two groups, each group is used as a training set to derive a linear model (i.e., particular a and B are derived for a particular group). Furthermore, the samples of the current luma block are also classified based on the same rule for the classification of neighbouring luma samples.

Threshold is calculated as the average value of the neighbouring reconstructed luma samples. A neighbouring sample with $Rec_L'[x,y]<=$Threshold is classified into group 1; while a neighbouring sample with $Rec_L'[x,y]>$Threshold is classified into group 2.

Correspondingly, a prediction for chroma is obtained using linear models:

$$\begin{cases} Pred_C[x, y] = \alpha_1 \times Rec'_L[x, y] + \beta_1 & \text{if } Rec'[x, y] \le \text{Threshold} \\ Pred_C[x, y] = \alpha_2 \times Rec'_L[x, y] + \beta_2 & \text{if } Rec'[x, y] > \text{Threshold} \end{cases}$$

Convolutional Cross-Component Model (CCCM)

In CCCM, a convolutional model is applied to improve the chroma prediction performance. The convolutional model has 7-tap filter consisting of a 5-tap plus sign shape spatial component, a nonlinear term and a bias term.

Output of the filter is calculated as a convolution between the filter coefficients and the input values and clipped to the range of valid chroma samples:

The filter coefficients are calculated by minimising MSE between predicted and reconstructed chroma samples in the reference area.

The MSE minimization is performed by calculating auto-correlation matrix for the luma input and a cross-correlation vector between the luma input and chroma output. Autocorrelation matrix is LDL decomposed and the final filter coefficients are calculated using back-substitution. The process follows roughly the calculation of the ALF filter coefficients in ECM, however LDL decomposition was chosen instead of Cholesky decomposition to avoid using square root operations.

Gradient Linear Model (GLM)

Compared with the CCLM, instead of down-sampled luma values, the GLM utilizes luma sample gradients to derive the linear model. Specifically, when the GLM is applied, the input to the CCLM process, i.e., the down-sampled luma samples L, are replaced by luma sample gradients G. The other parts of the CCLM (e.g., parameter derivation, prediction sample linear transform) are kept unchanged.

$$C = \alpha \cdot G + \beta$$

For signalling, when the CCLM mode is enabled for the current CU, two flags are signalled separately for Cb and Cr components to indicate whether GLM is enabled for each component. If the GLM is enabled for one component, one syntax element is further signalled to select one of 16 gradient filters (510-540 in FIG. 5) for the gradient calculation. The GLM can be combined with the existing CCLM by signalling one extra flag in bitstream. When such combination is applied, the filter coefficients that are used to derive the input luma samples of the linear model are calculated as the combination of the selected gradient filter of the GLM and the down-sampling filter of the CCLM.

Spatial GPM

JVET-Z0124 (Fan Wang, et al., "Non-EE2: Spatial GPM", Joint Video Exploration Team (JVET) of ITU-T SG 16 WP 3 and ISO/IEC JTC 1/SC 29/WG 11, 26th Meeting, by teleconference, 20-29 Apr. 2022, Document JVET-Z0124) proposed to extend GPM to intra prediction. Similar to inter GPM, SGPM consists of one partition mode and two associated intra prediction modes.

A template is used to generate this candidate list. The shape of the template is shown in FIG. 6. For each possible combination of one partition mode and two intra prediction modes, a prediction is generated for the template with the partitioning weight extended to the template, as shown in FIG. 6. These combinations are ranked in ascending order based on their SATD between the prediction and reconstruction of the template. The length of the candidate list is set equal to 16, and these candidates are regarded as the most probable SGPM combinations for the current block. Both encoder and decoder construct the same candidate list based upon the template.

Matrix Weighted Intra Prediction

Matrix weighted intra prediction (MIP) method is a newly added intra prediction technique in VVC. For predicting the samples of a rectangular block of width W and height H, matrix weighted intra prediction (MIP) takes one line of H reconstructed neighbouring boundary samples left of the block and one line of W reconstructed neighbouring boundary samples above the block as input. If the reconstructed samples are unavailable, they are generated as it is done in the conventional intra prediction. The generation of the prediction signal is based on the following three steps, i.e., averaging, matrix vector multiplication and linear interpolation.

Modification of LFNST for MIP Coded Blocks

In JVET-AB0067 (Junyan Huo, et. al., "EE2-4.1: Modification of LFNST for MIP coded block", Joint Video Experts Team (JVET) of ITU-T SG 16 WP 3 and ISO/IEC JTC 1/SC 29, 28th Meeting, Mainz, DE, 21-28 Oct. 2022, Document: JVET-AB0067), it is proposed to utilize DIMD to derive the LFNST transform set and determine LFNST transpose flag.

In FIG. 7, Matrix-Vector Multiplication 710 is applied to the input data to generate MIP prediction output 720. MIP prediction with upsampling 730 is applied to MIP prediction output 720 to generate upsampled MIP prediction 740. The proposed method uses the DIMD 750 to derive the intra prediction mode of the current block based on the MIP predicted samples before upsampling. Specifically, a horizontal gradient and a vertical gradient are calculated for each predicted sample to build a HoG 760, as shown in FIG. 7. Then the intra prediction mode with the largest histogram amplitude values is used to determine the LFNST transform set and LFNST Transpose flag.

Furthermore, LFNST is enabled for MIP coded blocks of width and height greater than or equal to 4.

Intra Block Copy

Intra block copy (IBC) is a tool adopted in HEVC extensions on SCC (Screen Content Coding). It is well known that it significantly improves the coding efficiency of screen content materials. Since IBC mode is implemented as a block level coding mode, block matching (BM) is performed at the encoder to find the optimal block vector (or motion vector) for each CU. Here, a block vector is used to indicate the displacement from the current block to a reference block, which is already reconstructed inside the current picture. The luma block vector of an IBC-coded CU is in integer precision. The chroma block vector is rounded to integer precision as well. When combined with AMVR (Adaptive Motion Vector Resolution), the IBC mode can switch between 1-pel and 4-pel motion vector precisions. An IBC-coded CU is treated as the third prediction mode other than intra or inter prediction modes. The IBC mode is applicable to the CUS with both width and height smaller than or equal to 64 luma samples.

Direct Block Vector (DBV) Mode for Chroma Prediction

The direct block vector is used for chroma blocks. A flag is signaled to indicate whether a chroma block is coded using IBC mode. If one of the luma blocks in the pre-defined locations is coded with IBC or intraTMP mode, its block vector is scaled and is used as block vector for the chroma block. Template matching is used to perform block vector scaling.

Inter Prediction Overview

According to JVET-T2002 Section 3.4. (Jianle Chen, et. al., "Algorithm description for Versatile Video Coding and Test Model 11 (VTM 11)", Joint Video Experts Team (JVET) of ITU-T SG 16 WP 3 and ISO/IEC JTC 1/SC 29, 20th Meeting, by teleconference, 7-16 Oct. 2020, Document: JVET-T2002)), for each inter-predicted CU, motion parameters consist of motion vectors, reference picture indices and reference picture list usage index, and additional information needed for the new coding feature of VVC to be used for inter-predicted sample generation. The motion parameter can be signalled in an explicit or implicit manner. When a CU is coded with skip mode, the CU is associated with one PU and has no significant residual coefficients, no coded motion vector delta or reference picture index. A merge mode is specified whereby the motion parameters for the current CU, which are obtained from neighbouring CUs, including spatial and temporal candidates, and additional schedules introduced in VVC. The merge mode can be applied to any inter-predicted CU, not only for skip mode. The alternative to the merge mode is the explicit transmission of motion parameters, where motion vector, corresponding reference picture index for each reference picture list and reference picture list usage flag and other needed information are signalled explicitly per each CU.

Beyond the inter coding features in HEVC, VVC includes a number of new and refined inter prediction coding tools listed as follows:

Extended merge prediction
    Merge mode with MVD (MMVD)
    Symmetric MVD (SMVD) signalling
    Affine motion compensated prediction Subblock-based temporal motion vector prediction (SbTMVP)

Adaptive motion vector resolution (AMVR)

Motion field storage: $\frac{1}{16}^{th}$ luma sample MV storage and 8×8 motion field compression Bi-prediction with CU-level weight (BCW)

Bi-directional optical flow (BDOF)

Decoder side motion vector refinement (DMVR)

Geometric partitioning mode (GPM)

Combined inter and intra prediction (CIIP)

The following description provides the details of those inter prediction methods specified in VVC.

Extended Merge Prediction

In VVC, the merge candidate list is constructed by including the following five types of candidates in order:

1) Spatial MVP from spatial neighbour CUs
2) Temporal MVP from collocated CUs
3) History-based MVP from an FIFO table
4) Pairwise average MVP
5) Zero MVs.

The size of merge list is signalled in sequence parameter set (SPS) header and the maximum allowed size of merge list is 6. For each CU coded in the merge mode, an index of best merge candidate is encoded using truncated unary binarization (TU). The first bin of the merge index is coded with context and bypass coding is used for remaining bins.

Bi-Prediction with CU-Level Weight (BCW)

In HEVC, the bi-prediction signal, $P_{bi-pred}$ is generated by averaging two prediction signals, $P_0$ and $P_1$ obtained from two different reference pictures and/or using two different motion vectors. In VVC, the bi-prediction mode is extended beyond simple averaging to allow weighted averaging of the two prediction signals.

$$P_{bi-pred} = ((8 - w) * P_0 + w * P_1 + 4) \gg 3 \quad (4)$$

Five weights are allowed in the weighted averaging bi-prediction, $w \in \{-2, 3, 4, 5, 10\}$. For each bi-predicted CU, the weight w is determined in one of two ways: 1) for a non-merge CU, the weight index is signalled after the motion vector difference; 2) for a merge CU, the weight index is inferred from neighbouring blocks based on the merge candidate index. BCW is only applied to CUs with 256 or more luma samples (i.e., CU width times CU height is greater than or equal to 256). For low-delay pictures, all 5 weights are used. For non-low-delay pictures, only 3 weights ($w \in \{3,4,5\}$) are used. At the encoder, fast search algorithms are applied to find the weight index without significantly increasing the encoder complexity. These algorithms are summarized as follows. The details are disclosed in the VTM software and document JVET-L0646 (Yu-Chi Su, et. al., "CE4-related: Generalized bi-prediction improvements combined from JVET-L0197 and JVET-L0296", Joint Video Experts Team (JVET) of ITU-T SG 16 WP 3 and ISO/IEC JTC 1/SC 29, 12th Meeting: Macao, CN, 3-12 Oct. 2018, Document: JVET-L0646).

The BCW weight index is coded using one context coded bin followed by bypass coded bins. The first context coded bin indicates if equal weight is used; and if unequal weight is used, additional bins are signalled using bypass coding to indicate which unequal weight is used.

In VVC, CIIP and BCW cannot be jointly applied for a CU. When a CU is coded with CIIP mode, the BCW index of the current CU is set to 2, (i.e., w=4 for equal weight). Equal weight implies the default value for the BCW index.

Geometric Partitioning Mode (GPM)

In VVC, a geometric partitioning mode is supported for inter prediction. The geometric partitioning mode is signalled using a CU-level flag as one kind of merge mode, with other merge modes including the regular merge mode, the MMVD mode, the CIIP mode and the subblock merge mode. In total 64 partitions are supported by geometric partitioning mode for each possible CU size w×h=$2^m \times 2^n$ with m, n $\in \{3 \ldots 6\}$ excluding 8×64 and 64×8.

When this mode is used, a CU is split into two parts by a geometrically located straight line (shown in FIG. 8). The location of the splitting line is mathematically derived from the angle and offset parameters of a specific partition. Each part of a geometric partition in the CU is inter-predicted using its own motion; only uni-prediction is allowed for each partition, that is, each part has one motion vector and one reference index. The uni-prediction motion constraint is applied to ensure that same as the conventional bi-prediction, only two motion compensated prediction are needed for each CU. The uni-prediction motion for each partition is derived If geometric partitioning mode is used for the current CU, then a geometric partition index indicating the partition mode of the geometric partition (angle and offset), and two merge indices (one for each partition) are further signalled. The number of maximum GPM candidate size is signalled explicitly in SPS and specifies syntax binarization for GPM merge indices. After predicting each of part of the geometric partition, the sample values along the geometric partition edge are adjusted using a blending processing with adaptive weights. This is the prediction signal for the whole CU, and transform and quantization process will be applied to the whole CU as in other prediction modes. Finally, the motion field of a CU predicted using the geometric partition modes is stored.

Uni-Prediction Candidate List Construction

The uni-prediction candidate list is derived directly from the merge candidate list constructed according to the extended merge prediction process. Denote n as the index of the uni-prediction motion in the geometric uni-prediction candidate list. The LX motion vector of the n-th extended merge candidate (X=0 or 1, i.e., LX=L0 or L1), with X equal to the parity of n, is used as the n-th uni-prediction motion vector for geometric partitioning mode. In case a corresponding LX motion vector of the n—the extended merge candidate does not exist, the L(1−X) motion vector of the same candidate is used instead as the uni-prediction motion vector for geometric partitioning mode.

Blending Along the Geometric Partitioning Edge

After predicting each part of a geometric partition using its own motion, blending is applied to the two prediction signals to derive samples around geometric partition edge. The blending weight for each position of the CU are derived based on the distance between individual position and the partition edge.

Combined Inter and Intra Prediction (CIIP)

In VVC, when a CU is coded in merge mode, if the CU contains at least 64 luma samples (that is, CU width times CU height is equal to or larger than 64), and if both CU width and CU height are less than 128 luma samples, an additional flag is signalled to indicate if the combined inter/intra prediction (CIIP) mode is applied to the current CU. As its name indicates, the CIIP prediction combines an inter prediction signal with an intra prediction signal. The inter prediction signal in the CIIP mode $P_{inter}$ is derived using the same inter prediction process applied to regular merge mode; and the intra prediction signal $P_{intra}$ is derived following the regular intra prediction process with the planar mode. Then, the intra and inter prediction signals are combined using weighted averaging, where the weight value wt is calculated depending on the coding modes of the top and left neighbouring blocks (as shown in FIG. 9) of current CU 910 as follows:

If the top neighbour is available and intra coded, then set isIntraTop to 1, otherwise set isIntraTop to 0;
If the left neighbour is available and intra coded, then set isIntraLeft to 1, otherwise set isIntraLeft to 0;
If (isIntraLeft+isIntraTop) is equal to 2, then wt is set to 3;
Otherwise, if (isIntraLeft+isIntraTop) is equal to 1, then wt is set to 2;
Otherwise, set wt to 1.
The CIIP prediction is formed as follows:

$$P_{CIIP} = ((4 - wt) * P_{inter} + wt * P_{intra} + 2) \gg 2 \quad (5)$$

Multi-Hypothesis Prediction (MHP) (More Details can be Found in JVET-W2025.)

In the multi-hypothesis inter prediction mode (JVET-M0425), one or more additional motion-compensated prediction signals are signalled, in addition to the conventional bi prediction signal. The resulting overall prediction signal is obtained by sample-wise weighted superposition. With the bi prediction signal $p_{bi}$ and the first additional inter prediction signal/hypothesis $h_3$, the resulting prediction signal $p_3$ is obtained as follows:

$$p_3 = (1 - \alpha)p_{bi} + \alpha h_3$$

The weighting factor $\alpha$ is specified by the new syntax element add_hyp_weight_idx, according to the mapping in Table 1.

TABLE 1

Mapping between weighting factor $\alpha$ and add_hyp_weight_idx.

| add_hyp_weight_idx | $\alpha$ |
|---|---|
| 0 | ¼ |
| 1 | −⅛ |

Analogously to above, more than one additional prediction signal can be used. The resulting overall prediction signal is accumulated iteratively with each additional prediction signal.

$$P_{n+1} = (1 - \alpha_{n+1})p_n + \alpha_{n+1}h_{n+1}$$

The resulting overall prediction signal is obtained as the last $p_n$ (i.e., the $p_n$ having the largest index n). For example, up to two additional prediction signals can be used (i.e., n is limited to 2).

The motion parameters of each additional prediction hypothesis can be signalled either explicitly by specifying the reference index, the motion vector predictor index, and the motion vector difference, or implicitly by specifying a merge index. A separate multi-hypothesis merge flag distinguishes between these two signalling modes.

In the present invention, methods to improve the performance of combined prediction are disclosed.

BRIEF SUMMARY OF THE INVENTION

A method and apparatus for video coding using combined prediction are disclosed. According to this method, input data associated with a current block are received, wherein the input data comprise pixel data to be encoded at an encoder side or coded data associated with the current block to be decoded at a decoder side. A combined predictor is derived, wherein the combined predictor comprises a weighted combination of one or more source terms, and wherein one or more weightings for the weighted combination of one or more source terms are derived using a regression technique based on relationship estimation based on one or more templates, and wherein said one or more source terms correspond to different prediction modes for the current block and the different prediction modes comprise at least one non-intra mode, or said one or more source terms correspond to member samples in a pattern determined associated with a to-be-predicted sample for the current block. The current block is encoded or decoded using information comprising the combined predictor.

In one embodiment, each member sample corresponds to an initial predicted sample of combining prediction mode. In one embodiment, said one or more templates comprise an above reference region of the current block, a left reference region of the current block, an above-left reference region of the current block, or a combination thereof.

In one embodiment, the combined predictor corresponds to a target predictor generated according to Inter and Intra Prediction (CIIP). In one embodiment, each of said one or more source terms correspond to one or more predicted samples associated with an inter mode index from an inter candidate list or an intra mode index from an intra candidate list. In another embodiment, said one or more source terms correspond to one or more combined predicted samples derived according to the CIIP.

In one embodiment, the combined predictor corresponds to a target predictor generated according to Multiple-Hypothesis Prediction (MHP). In one embodiment, each of said one or more source terms correspond to one or more predicted samples associated with an inter mode index from an inter candidate list. In another embodiment, said one or more source terms correspond to one or more combined predicted samples derived according to the MHP.

In one embodiment, the combined predictor corresponds to a target predictor generated according to Bi-prediction with CU-level Weight (BCW). In one embodiment, each of said one or more source terms correspond to one or more predicted samples associated with an inter mode index from an inter candidate list. In another embodiment, said one or more source terms correspond to one or more combined predicted samples derived according to the BCW.

In one embodiment, the regression technique corresponds to Linear Minimum Mean Square Error (LMMSE) technique. In another embodiment, the regression technique corresponds to LDL decomposition technique. In one embodiment, the regression technique is unified with a technique for cross-component chroma mode. In yet another embodiment, the regression technique corresponds to Gaussian elimination technique. In one embodiment, the relationship estimation corresponds to distortion between predicted samples and reconstructed samples on said one or more templates.

BRIEF DESCRIPTION OF THE DRAWINGS

FIGS. 10A-C illustrate examples of patterns used to select source terms at a centre (FIG. 10A), where a cross pattern (10B) and a diamond pattern (FIG. 10C) are shown for the luma component.

FIGS. 11A-C illustrate examples of patterns used to select source terms at a centre (FIG. 11A), where a cross pattern (11B) and a diamond pattern (FIG. 11C) are shown for the chroma component.

FIG. 12 illustrates an example of the reference region of the current block for deriving the combined, inter, or intra prediction using a template-regression based technique.

DETAILED DESCRIPTION OF THE INVENTION

Figure 1A:
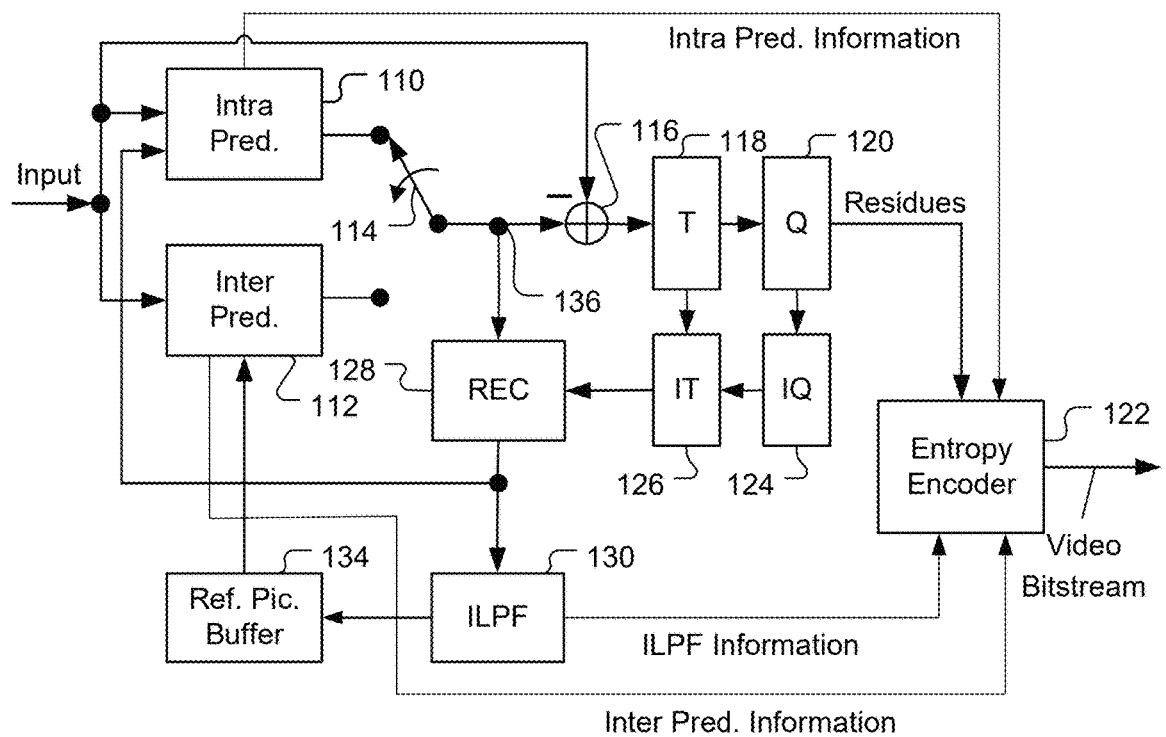
FIG. 1A illustrates an exemplary adaptive Inter/Intra video encoding system incorporating loop processing.

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention. References throughout this specification to "one embodiment," "an embodiment," or similar language mean that a particular feature, structure, or characteristic described in connection with the embodiment may be included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention. The illustrated embodiments of the invention will be best understood by reference to the drawings, wherein like parts are designated by like numerals throughout. The following description is intended only by way of example, and simply illustrates certain selected embodiments of apparatus and methods that are consistent with the invention as claimed herein.

In this invention, a template-regression based method for deriving combined prediction for the current block is disclosed.

In this invention, a novel mechanism to improve accuracy of prediction is proposed. The prediction of the current bock is formed by combining one or more proposed source terms and a proposed weighting setting. As shown in equation (6), pred(i, j) is a target (predicted) sample in the current block that can be obtained after this proposed mechanism, source-TermSet0 includes one or more source terms from luma component, sourceTermSet1 includes one or more source terms from chroma components, and biasTermSet includes one or more bias terms. One or more target samples can be viewed as the information comprising the combined predictor and/or the one or more target samples are used to encode or decode the current block.

$$pred(i, j) = \qquad (6)$$
$$(sourceTermSet0(i, j) + sourceTermSet1(i, 1) + \ldots + biasTermSet)$$

with the proposed weighting setting where (i, j) is a sample position in the current block.

Equation (6) is just an example and the proposed mechanism can use any subset or extension of sourceTermSet0, sourceTermSet1, and biasTermSet. Each sample or any subset of samples in the current block gets its target (predicted) sample according to the equation (6). In the following, the content of sourceTermSet0 is described in Section I, the content of source TermSet1 is described in Section II, the content of biasTermSet is described in Section III, and the predictor derivation using the proposed source terms and the proposed weighting setting is described in Section IV. Several coding tools, including MHP and/or BCW and/or CIIP and/or fusion of chroma cross-component prediction modes (e.g. TIMD-CCM), with our proposed mechanism are shown in Section IV.

I. Content of sourceTermSet0(i, j)

SourceTermSet0(i, j) includes one or more luma source terms denoted as source $Term0_0$, source$Term0_1$, ..., and/or source$Term0_{n-1}$. The value of n means the number of taps for the source term set. In one embodiment, the source terms can be linear terms and/or non-linear terms, only linear terms, and/or only non-linear terms. In another embodiment, n is a pre-defined value such as 1, 2, ... or any positive integer. For example, the pre-defined value is fixed in the standard.

For another example, the pre-defined value is smaller than or equal to a maximum threshold indicated by a syntax in the bitstream where the syntax is at block, CTU, CTB, slice, tile, picture, SPS, PPS, picture, and/or sequence level. In another embodiment, n is determined according to coding information of the current block and/or sample position (i, j). For example, when the current block is coded using a specific coding tool, n is (1) fixed at a pre-defined value, (2) determined according to block width, block height, block area, coding information and/or sample information for the current block, (3) determined according to coding information and/or sample information for the adjacent/non-adjacent spatial neighbouring reference region of the current block, and/or (4) determined according to coding information and/or sample information for the temporal reference region of the current block. In another embodiment, the pattern of the n taps refers to a pattern defined as any subset of a window region M×N around/including the position ($i_L$, $j_L$). That is, ($i_L$, $j_L$) is used to derive the window and/or the pattern which means one or more to-be-used positions. For some examples, ($i_L$, $j_L$) refers to the centre of the window and/or the pattern. However, ($i_L$, $j_L$) is not limited to referring to the centre of the window and/or the pattern. If the target sample is luma, ($i_L$, $j_L$) is (i, j). If the target sample is chroma (cb or cr), ($i_L$, $j_L$) is the collocated luma position from (i, j).

For one example, ($i_L$, $j_L$) refers to the centre of the window and only the centre ($i_L$, $j_L$) of the window is used, as shown in FIG. 10A, where the centre is indicated by a grey square C. For another example, ($i_L$, $j_L$) refers to the centre of the window and the pattern is a 5×5 cross, which may or may not include the centre at ($i_L$, $j_L$) as shown in FIG. 10B, where samples used as source terms are shown as dot-filled squares. For yet another example, ($i_L$,$j_L$) refers to the centre of the window and the pattern is a 5×5 diamond, which may or may not include the centre ($i_L$,$j_L$) as shown in FIG. 10C, where samples used as source terms are shown as dot-filled squares.

In another embodiment, different taps refer to the source terms from different prediction modes or different mode types. In one sub-embodiment, one or more taps are from mode type intra, another one or more taps are from mode type inter, and/or another one or more taps are from mode type IBC. In another sub-embodiment, one or more taps are from MIP intra prediction modes, another one or more taps are from non-MIP intra prediction modes.

For a source term in the source term set, the following embodiments are used to determine generation of source content.

In one embodiment, the source content is based on a predicted sample generated by a prediction mode and/or a reconstructed sample generated based on the predicted sample by a prediction mode and a reconstructed residual.

In one sub-embodiment, the prediction mode belongs to mode type intra, mode type inter, or a third mode type (e.g. mode type IBC). For example, the prediction mode belongs to mode type intra, the prediction mode refers to planar, DC, horizontal, vertical, other angular (directional) prediction mode, any intra prediction mode specified in 67/131 intra prediction mode domain, wide-angle intra prediction (WAIP) modes, TIMD derived modes, DIMD derived modes, intraTMP, and/or any intra prediction modes specified in the standard. For another example of the prediction mode belonging to mode type inter, the prediction mode refers to skip mode, regular merge modes, MMVD modes, affine modes, SbTMVP, AMVR, any merge mode specified in the standard, any AMVP (advanced MVP where AMVP can be called as non-merge inter) mode specified in the standard, or any inter mode specified in the standard. For another example of the prediction mode belonging to mode type IBC, the prediction mode refers to IBC merge, IBC AMVP, or any IBC mode specified in the standard. Note that any possible combination between the prediction mode and the mode type is supported in this invention. That is, any mentioned prediction mode can be under any mode type according to the standard definition. For example, following the standard definition, if IBC mode belongs to mode type inter, the prediction mode belongs to mode type inter in the embodiments can refer to an IBC mode.

In another sub-embodiment, the source content is the filtered source or the source with any pre-processing. For example, the source content is the predicted/reconstructed sample after filtering with a pre-defined model or filter.

Figure 5:
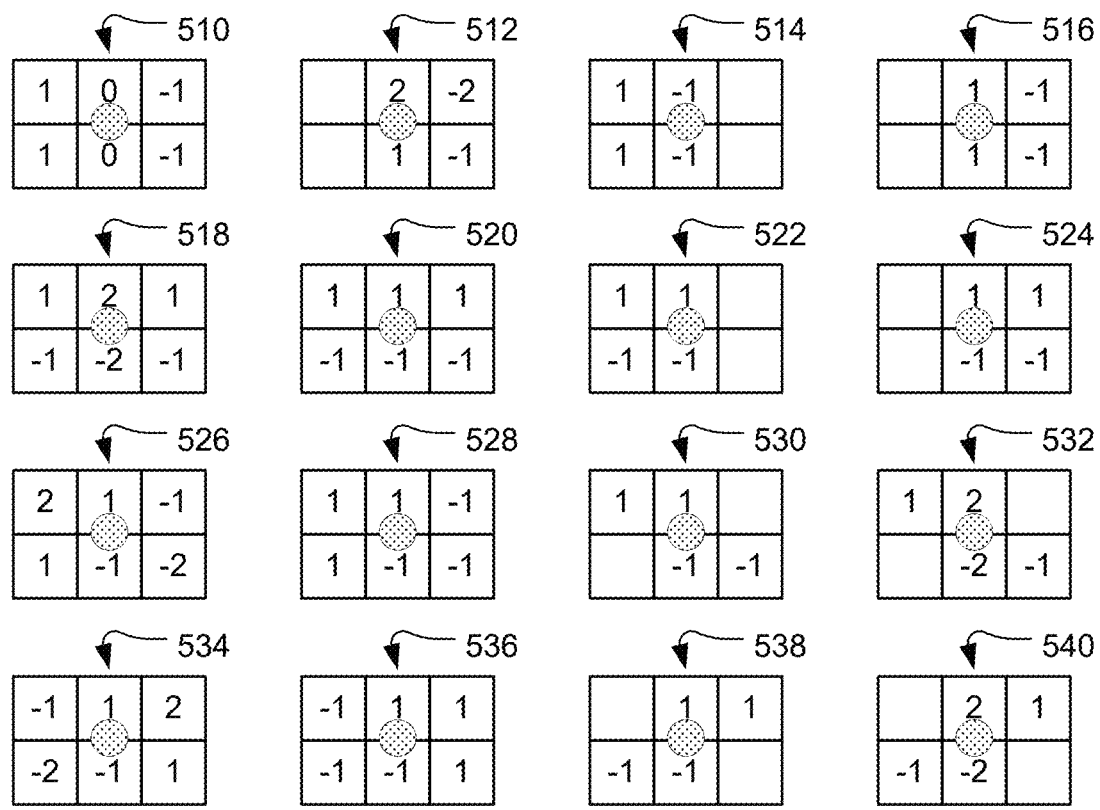
FIG. 5 illustrates the 16 gradient patterns for Gradient Linear Model (GLM).
Figure 6:
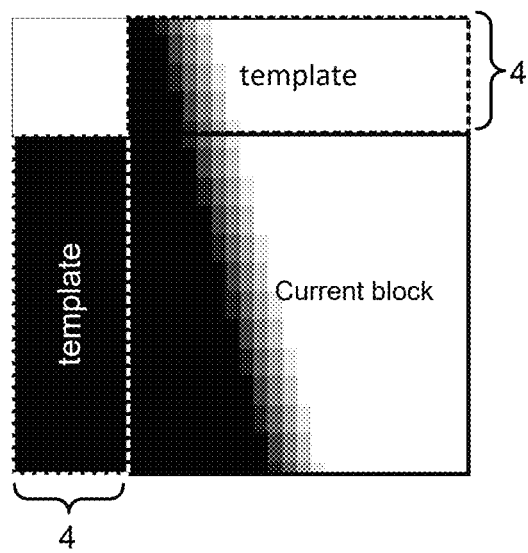
FIG. 6 illustrates an example of template for Spatial GPM (SGPM).
Figure 7:
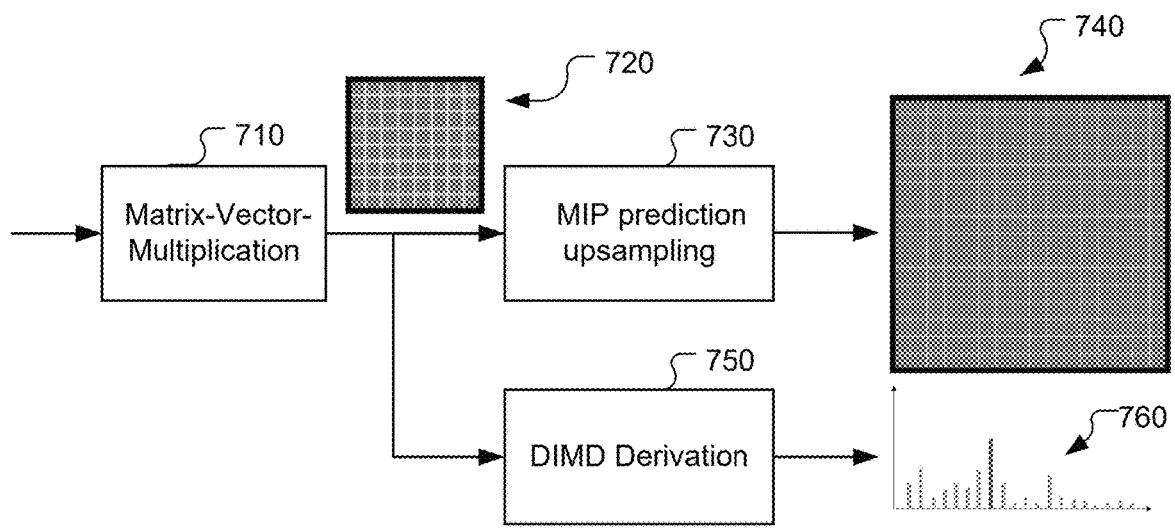
FIG. 7 illustrates an example of LFNST modification for MIP coded blocks, which utilizes DIMD to derive the LFNST transform set and determine LFNST transpose flag.
Figure 8:
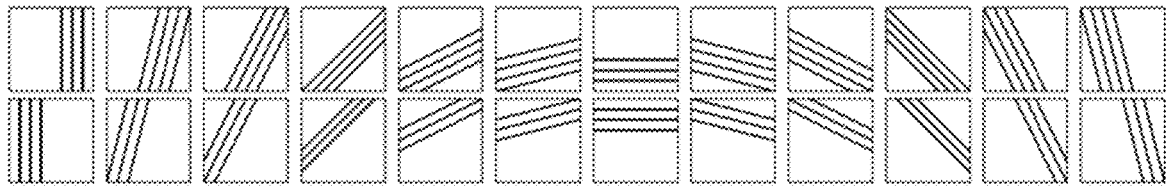
FIG. 8 illustrates examples of the GPM splits grouped by identical angles.
Figure 9:
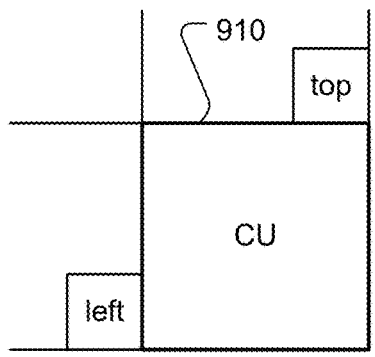
FIG. 9 illustrates an example of the weight value derivation for Combined Inter and Intra Prediction (CIIP) according to the coding modes of the top and left neighbouring blocks.

In another sub-embodiment, the source content is gradient information from the predicted samples and/or reconstructed samples. If the target sample (i, j) belongs to chroma and gradient information of the collocated luma sample (as the centre circle) is calculated with any one of the following Sobel filters (gradient filters as shown in FIG. 5) or any pre-defined filter. Each value around the centre circle is multiplied with the corresponding predicted/reconstructed samples in the collocated luma block and then added with each other to form the gradient information for the source term of the target sample (i, j).

In another sub-embodiment, if the target sample belongs to a luma sample, the predicted sample and/or the reconstructed sample is located within the current block; otherwise (the target sample belongs to a chroma sample (cb or cr)), the predicted sample and/or the reconstructed sample is located within the collocated (luma) block from the current (chroma) block. The predicted sample and/or the reconstructed sample is treated as an initial sample and used as source content to generate the target sample.

In another embodiment, the values of the source terms are further adjusted (added or subtracted) by a pre-defined offset. If the target sample refers to luma, several embodiments are used to generate the offset of the source term. In one sub-embodiment, the offset is determined as the averaging value of (or any subset of) predicted or reconstructed samples in the current block or in the reference region of the current block. In another sub-embodiment, the offset is determined as a sample value of a pre-defined predicted or reconstructed samples in the current block or in the reference region of the current block. For example, the sample value is from the top-left position (just outside of the top-left corner of the current block). If the target sample refers to chroma, several embodiments are used to generate the offset of the source term. In one sub-embodiment, the offset is determined as the averaging value of (or any subset of) predicted or reconstructed samples in the collocated luma block from the current (chroma) block or in the reference region of the collocated luma block. In another sub-embodiment, the offset is determined as a sample value of a pre-defined predicted or reconstructed samples in the collocated luma block or in the reference region of the collocated luma block. For example, the sample value is from the top-left position (just outside of the top-left corner of the collocated luma block).

In another embodiment, the source term may further include location information. For example, if the target sample refers to luma, the horizontal location (i) of (i, j) is used in a source term and the vertical location (j) of (i, j) is used in a source term; Otherwise, the horizontal location of the collocated luma block from the sample (i, j) is used in a source term and the vertical location of the collocated luma block from the sample (i, j) is used in a source term.

In another embodiment, the source term may further include location information. For example, if the target sample refers to luma, the horizontal location (i) of (i, j) is used in a source term and the vertical location (j) of (i, j) is used in a source term; Otherwise, the horizontal location of the collocated luma from the sample (i, j) is used in a source term and the vertical location of the collocated luma from the sample (i, j) is used in a source term.

II. Content of sourceTermSet1(i, j)

SourceTermSet1(i, j) includes one or more chroma (cb or cr) source terms denoted as $sourceTerm1_0$, $sourceTerm1_1$, ..., and/or $sourceTerm1_{m-1}$. The value of m means the number of taps for the source term set. In one embodiment, the source terms can be linear terms and/or non-linear terms, only linear terms, and/or only non-linear terms. In another embodiment, m is a pre-defined value such as 1, 2, ... or any positive integer. For example, the pre-defined value is fixed in the standard. For another example, the pre-defined value is smaller than or equal to a maximum threshold indicated by a syntax in the bitstream where the syntax is at block, CTU, CTB, slice, tile, picture, SPS, PPS, picture, and/or sequence level. In another embodiment, m is determined by coding information of the current block and/or sample position (i, j). For example, when the current block is coded by a specific coding tool, m is (1) fixed at a pre-defined value, (2) determined according to block width, block height, block area, coding information and/or sample information for the current block, (3) determined according to coding information and/or sample information for the adjacent/non-adjacent spatial neighbouring reference region of the current block, and/or (4) determined according to coding information and/or sample information for the temporal reference region of the current block. In another embodiment, the pattern of the m taps refers to a pattern defined as any subset of a window region M2×N2 around/including the position $(i_C, j_C)$. That is, $(i_C, j_C)$ is used to derive the window and/or the pattern which means one or more to-be-used positions. For some examples, $(i_C, j_C)$ refers to the centre of the window and/or the pattern. However, $(i_C, j_C)$ is not limited to referring to the centre of the window and/or the pattern. If the target sample is chroma (cb or cr), $(i_C, j_C)$ is (i, j). If the target sample is luma, $(i_C, j_C)$ is the collocated chroma position from (i, j).

For one example, $(i_C, j_C)$ refers to the centre of the window and only the centre $(i_C, j_C)$ of the window is used, as shown in FIG. 11A, where the centre is indicated by a grey square C. For another example, $(i_C, j_C)$ refers to the centre of the window and the pattern is a 5×5 cross, which may or may not include the centre at $(i_C, j_C)$ as shown in FIG. 11B, where samples used as source terms are shown as dot-filled squares. For yet another example, $(i_C, j_C)$ refers to the centre of the window and the pattern is a 5×5 diamond, which may or may not include the centre $(i_C, j_C)$ as shown in FIG. 11C, where samples used as source terms are shown as dot-filled squares.

In another embodiment, different taps refer to the source terms from different prediction modes or different mode types. In one sub-embodiment, one or more taps are from mode type intra, another one or more taps are from mode type inter, and/or another one or more taps are from mode type IBC. In another sub-embodiment, one or more taps are from MIP intra prediction modes, another one or more taps are from non-MIP intra prediction modes.

For a source term in the source term set, the following embodiments are used to determine generation of source content.

In one embodiment, the source content is based on a predicted sample generated by a prediction mode and/or a reconstructed sample generated based on the predicted sample by a prediction mode and a reconstructed residual.

In one sub-embodiment, the prediction mode belongs to mode type intra, mode type inter, or a third mode type (e.g. mode type IBC). For an example of the prediction mode belonging to mode type intra, the prediction mode refers to planar, DC, horizontal, vertical, other angular (directional) prediction mode, any intra prediction modes specified in 67/131 intra prediction mode domain, wide-angle intra prediction (WAIP) modes, TIMD derived modes, DIMD derived modes, intraTMP, DBV, any one of cross-component modes (CCLM (including CCLM_LT, CCLM_L, and/or CCLM_T), MMLM (including MMLM_LT, MMLM_L, and/or MMLM_T), CCCM (including CCCM_LT, CCCM_L, and/or CCCM_T), GLM, and/or any variation/extension of the above modes), and/or any intra prediction modes specified in the standard. For another example of the prediction mode belonging to mode type inter, the prediction mode refers to skip mode, regular merge modes, MMVD modes, affine modes, SbTMVP, AMVR, any merge mode specified in the standard, any AMVP mode specified in the standard, or any inter mode specified in the standard. For another example of the prediction mode belonging to mode type IBC, the prediction mode refers to IBC merge, IBC AMVP (advanced MVP where AMVP can be called as non-merge inter), or any IBC mode specified in the standard. Note that any possible combination between the prediction mode and the mode type is supported in this invention. That is, any mentioned prediction mode can be under any mode type according to the standard definition. For example, following the standard definition, if IBC mode belongs to mode type inter, the prediction mode belongs to mode type inter in the embodiments can refer to an IBC mode. In one embodiment, DBV can be viewed as using IBC to generate chroma predicted samples.

In another sub-embodiment, the source content is the filtered source or the source with any pre-processing. For example, the source content is the predicted/reconstructed sample after filtering with a pre-defined model or filter.

In another sub-embodiment, the source content is gradient information from the predicted samples and/or reconstructed samples. If the target sample (i, j) belongs to luma and gradient information of the collocated chroma sample is calculated with any one of the Sobel filters, any one of the gradient filters, or any pre-defined filter.

In another sub-embodiment, if the target sample belongs to a chroma sample, the predicted sample and/or the reconstructed sample is located within the current block; otherwise (the target sample belongs to a luma sample), the predicted sample and/or the reconstructed sample is located within the collocated (chroma) block from the current (luma) block. The predicted sample and/or the reconstructed sample is treated as an initial sample and used as source content to generate the target sample.

In another embodiment, the values of the source terms are further adjusted (added or subtracted) by a pre-defined offset. If the target sample refers to chroma, several embodiments are used to generate the offset of the source term. In one sub-embodiment, the offset is determined as the averaging value of (or any subset of) predicted or reconstructed samples in the current block or in the reference region of the current block. In another sub-embodiment, the offset is determined as a sample value of a pre-defined predicted or reconstructed samples in the current block or in the reference region of the current block. For example, the sample value is from the top-left position (just outside of the top-left corner of the current block). If the target sample refers to luma, several embodiments are used to generate the offset of the source term. In one sub-embodiment, the offset is determined as the averaging value of (or any subset of) predicted or reconstructed samples in the collocated chroma block from the current (luma) block or in the reference region of the collocated chroma block. In another sub-embodiment, the offset is determined as a sample value of a pre-defined predicted or reconstructed samples in the collocated chroma block or in the reference region of the collocated chroma block. For example, the sample value is from the top-left position (just outside of the top-left corner of the collocated chroma block).

In another embodiment, the source term may further include location information. For example, if the target sample refers to chroma, the horizontal location (i) of (i, j) is used in a source term and the vertical location (j) of (i, j) is used in a source term; Otherwise, the horizontal location of the collocated chroma block from the sample (i, j) is used in a source term and the vertical location of the collocated chroma block from the sample (i, j) is used in a source term.

III. Content of biasTermSet

Bias term is any pre-defined value. In one embodiment, the bias term is a midValue according to bitDepth specified in the standard. For example, the bias term is set as (1<<(bitDepth−1)). In another embodiment, the bias term is the same for each sample in the current block. That is, the bias term is regardless of the position (i, j).

IV. Predictor Derivation for Sample (i, j)

IV.1. Proposed Weighting Setting

The proposed weighting setting is to estimate the relationship (for example, minimizing the distortion) between the combining results of those source terms and the reconstructed samples on the reference region of the current block by a pre-defined regression method, to generate a weighting (referring to model parameters) according to the regression method, and then to apply the weighting on the source terms to get the target (predicted) samples in the current block. In one embodiment, the pre-defined regression method can be linear minimum mean square error (LMMSE) method as cross-component modes, for example, CCLM or can be any unified method with the regression method used for cross-component modes, for example, CCLM. In another embodiment, the pre-defined regression method can be the LDL decomposition method as CCCM or can be any unified method with the regression method used for CCCM. In another embodiment, the pre-defined regression method can be Gaussian elimination.

In one embodiment, the reference region of the current block is the spatial adjacent or nonadjacent neighbouring region of the current block 1210 as shown in FIG. 12. The spatial neighbouring region of the current block (as template of the current block) includes above reference region 1220, left reference region 1230, above-left reference region 1240, and/or any subset of the above. The size of the above reference region is $A_w \times A_H$, the size of the left reference region is $L_w \times L_H$, and the size of the above-left reference is $AL_W \times AL_H$, where $A_w$=block width of the current block (W), k*W, W+block height of the current block (H), any pre-defined value, or any adaptive value depending on the block position, block width, block height, and/or block area of the current block.

$A_H$ or $AL_H$=H, any pre-defined value (1, 2, 4, . . . ), or any adaptive value depending on the block position, block width, block height, and/or block area of the current block.

$L_w$ or $AL_w$=W, any pre-defined value (1, 2, 4, . . . ), or any adaptive value depending on the block position, block width, block height, and/or block area of the current block.

$L_H$=H, k*H, H+W, any pre-defined value, or any adaptive value depending on the block position, block width, block height, and/or block area of the current block.

IV.2. Different Example Expressions $$pred_C(i, j) = \alpha_0 \cdot G(i, j) + \alpha_1 \cdot rec'_L(i, j) + \alpha_2 \cdot \text{bias} \qquad \text{IV.2.1}$$

In this expression of the target sample being chroma, sourceTermSet0 includes two taps as G(i, j) and rec'L(i, j), sourceTermSet1 is not used, and biasTerm refers to another one tap as midValue. G(i,j) is the gradient information generated from a selected gradient filter and $rec_L'(i, j)$ is down-sampled reconstructed luma sample. The model parameters (a0, a1, and a2) of the weighting are derived based on:

Using six rows and columns adjacent samples as the reference region of the current block Using the LDL decomposition method as the regression method $$pred_C(i, j) = \alpha_0 \cdot C + \alpha_1 \cdot Gy(i, j) + \alpha_2 \cdot Gx(i, j) + \qquad \text{IV.2.2}$$
$$\alpha_3 \cdot Y(i, j) + \alpha_4 \cdot X(i, j) + \alpha_5 \cdot P(i, j) + \alpha_6 \cdot \text{bias}$$

In this expression (similar to JVET-AC0054) of the target sample being chroma, source TermSet0 includes six taps as C (the collocated/corresponding luma reconstructed sample), Gy(i, j), Gx(i, j), Y, X, and P (e.g., a non-linear term as CCCM), sourceTermSet1 is not used, and biasTerm refers to another one tap as midValue.

Gy(i,j) is the gradient information generated from a vertical gradient filter.

Gx(i,j) is the gradient information generated from a horizontal gradient filter.

Y and X are the vertical and horizontal locations of the collocated luma sample.

Using six rows and columns adjacent samples as the reference region of the current block Using the LDL decomposition method as the regression method $$pred_L(i, j) = \alpha_0 \cdot \text{Pmode\_0}(i, j) + \qquad \text{IV.2.3}$$
$$\alpha_1 \cdot \text{Pmode\_1}(i, j) + \ldots + \alpha_{s-1} \cdot \text{Pmode\_s} - 1(i, j) + \alpha_s \cdot \text{bias}$$

In this expression of the target sample being luma for a inter coded block, source TermSet0 includes s taps as Pmode_0 to Pmode_s−1, sourceTermSet1 is not used, and biasTerm refers to another one tap as midValue.

Each or any subset of Pmode_0(i, j) to Pmode_s−1(i, j) is the predicted sample from the mode indicated by an inter mode index. For example, Pmode_0(i, j) is the predicted sample from the first mode. For example, Pmode_s−1(i, j) is the predicted sample from the s-th mode (or (s−1)-th mode if the first mode is 0-th mode). In one embodiment, an inter candidate list is built first and s inter motion candidates in the inter candidate list are used. For example, the inter candidate list refers to a merging/AMVP candidate list which is the same or different from the merging/AMVP candidate list for regular merge/AMVP mode. For example, the merging candidate list for regular merge mode is reused to derive the merging candidate list for the proposed mechanism. In another embodiment, only uni-prediction, only bi-prediction, or uni-prediction and/or bi-prediction inter motion candidates are inserted in the inter candidate list. In another embodiment, the maximum number of candidates in the inter candidate list is specified in the standard as a fixed number or as a syntax in block-level, CTU-level, SPS-level, PPS-level, slice-level, tile-level, picture-level, and/or sequence-level signalling. In another embodiment, an inter mode index is signalled/parsed for indicating each mode (mode 0 to s or s−1). In another embodiment, an inter mode index is signalled/parsed to indicate a mode (e.g. mode_0) and for the remaining modes, they are selected according to mode 0. In another embodiment, two candidate lists are built. The one or more modes can be selected from one of the two candidate lists or both of the two candidate lists. One list is an inter candidate list containing one or more inter motion candidates and the other is an intra candidate list containing one or more intra candidates. If a list only contains one candidate, the only one candidate is inferred to be used without signalling.

Parameters $a_0$ to $a_{s-1}$ can be viewed as a weighting to combine each predictor from the to-be-combined mode.

In one embodiment, the proposed mechanism is treated as an optional mode (for example, an optional mode of MHP). That is, a flag is signalled/parsed at the encoder/decoder to indicate whether to use the proposed mechanism for the current block (coded by MHP). In one sub-embodiment, the flag is at block-level, CTU-level, slice-level, SPS-level, tile-level, PPS-level, and/or picture-level. In another embodiment, the flag is context-coded. For example, only one context is used for signalling the flag. For another example, the context selection of the flag depends on the coding information, block width, block height, and/or block area of the current block and/or the coding information, block width, block height, and/or block area of the neighbouring block.

In another embodiment, the proposed mechanism is a replacement method. When generating the predictors of the current MHP-coded block with supporting the proposed mechanism, the generation of the predictor is inferred to follow the proposed mechanisms.

In another embodiment, s here is a pre-defined value. For example, s=1, 2, 3, or any positive integer. In one sub-embodiment, s is fixed at the pre-defined value in the standard. In another sub-embodiment, s is adaptive according to the coding information, block width, block height, and/or block area of the current block and/or the coding information, block width, block height, and/or block area of the neighbouring block. For example, if the block width height, or area is larger than a pre-defined threshold, s is a larger number; otherwise, s is a smaller number.

In another embodiment, when using the regression method to derive the model parameters on the reference region of the current block, the to-be-minimized distortion is between the combining result, including (1) predictors generated from the mode 0 to s−1 on the reference region of the current block and (2) bias and (3) weighting setting, and the reconstructed samples on the reference region of the current block.

In another embodiment, sourceTermSet1 can be used in the expression. That is, the corresponding chroma information can be used to generate the target luma samples.

In another embodiment, the wording "MHP" can be replaced with "BCW", "GPM", "CIIP", and/or any luma/chroma coding tools, which uses multiple hypotheses of prediction to form the final prediction of the current block, to apply the proposed mechanism when the current block uses the certain coding tool. When the proposed mechanism is applied to BCW, each hypothesis of prediction refers to a uni-prediction from different lists (list0 or list1) and the expression of generating final prediction is shown as follows. The hypotheses of predictions from list0 and list1 are indicated with a shared inter mode index such as a merge candidate index or an AMVP candidate index.

$$pred_L(i, j) = \alpha_0 \cdot \text{Plist\_0}(i, j) + \alpha_1 \cdot \text{Plist\_1}(i, j) + \alpha_2 \cdot \text{bias}$$

$$pred_L(i, j) = \alpha_0 \cdot \text{Ppat\_0}(i, j) + \alpha_1 \cdot \text{Ppat\_1}(i, j) + \ldots + \alpha_{s-1} \cdot \text{Ppat\_s} - 1(i, j) + \alpha_s \cdot \text{bias} \quad \text{IV.2.4}$$

In this expression of the target sample being luma for an inter coded block, source TermSet0 includes s taps as Ppat_0 to Ppat_s−1, sourceTermSet1 is not used, and biasTerm refers to another one tap as midValue.

Each or any subset of Ppat_0(i, j) to Ppat_s−1(i, j) is the combined predicted sample following the rule of the inter coding tool for the current block. Each combined predicted sample can be viewed as a member sample corresponding to an initial predicted sample of combining prediction mode (e.g., MHP, BCW, and/or CIIP). For an example of the inter coding tool being MHP, the combined predicted sample is formed by a MHP weighted average of each predictor generated from a MHP to-be-blended prediction mode. 0 to s−1 indicates the s-tap pattern (any pre-defined pattern in the section I) of the source terms.

In one embodiment, the proposed mechanism is treated as an optional mode (for example, an optional mode of MHP). That is, a flag is signalled/parsed at the encoder/decoder to indicate whether to use the proposed mechanism for the current block (coded by MHP). In one sub-embodiment, the flag is at block-level, CTU-level, slice-level, SPS-level, tile-level, PPS-level, and/or picture-level. In another embodiment, the flag is context-coded. For example, only one context is used for signalling the flag. For another example, the context selection of the flag depends on the coding information, block width, block height, and/or block area of the current block and/or the coding information, block width, block height, and/or block area of the neighbouring block.

In another embodiment, the proposed mechanism is a replacement method. When generating the predictors of the current MHP-coded block with supporting the proposed mechanism, the generation of the predictor is inferred to follow the proposed mechanisms.

In another embodiment, s here is a pre-defined value. For example, s=1, 2, 3, or any positive integer. In one sub-embodiment, s is fixed at the pre-defined value in the standard. In another sub-embodiment, s is adaptive according to the coding information, block width, block height, and/or block area of the current block and/or the coding information, block width, block height, and/or block area of the neighbouring block. For example, if the block width height, or area is larger than a pre-defined threshold, s is a larger number; otherwise, s is a smaller number.

In another embodiment, when using the regression method to derive the model parameters on the reference region of the current block, the to-be-minimized distortion is between the combining result, including (1) combining predictors generated from the pattern tap 0 to s−1 on the reference region of the current block and (2) bias and (3) weighting setting, and the reconstructed samples on the reference region of the current block.

In another embodiment, source TermSet1 can be used in the expression. That is, the corresponding chroma information can be used to generate the target luma samples.

In another embodiment, the wording "MHP" can be replaced with "BCW", "GPM", "CIIP", and/or any luma coding tools to apply the proposed mechanism when the current block uses the certain coding tool. When the certain coding tool is GPM, generating combining predictors on either the reference region of the current block or within the current block, GPM weighted averaging follows the GPM partitioning line. That is, following GPM blending rule, for the samples nearing the partitioning line, equal weight is used for both of the predictions from the GPM to-be-blended prediction modes; for the samples far away from the partitioning line, a larger weight is used for the prediction from one of GPM to-be-blended modes and a smaller weight is used for the other prediction from of the other GPM to-be-blended mode if the current sample is located at the prediction unit belonging to the one of GPM to-be-blended modes (not belonging to the other GPM to-be-blended mode).

$$pred_C(i, j) = \qquad \qquad \text{IV.2.5}$$
$$\alpha_0 \cdot \text{P\_CCM\_0}(i, j) + \ldots + \alpha_{s-1} \cdot \text{P\_CCM}_{s-1}(i, j) + \alpha_s \cdot \text{bias}$$

In this expression of the target sample being chroma for a block coded by cross-component mode (CCM), sourceTermSet1 includes s taps as P_CCM_0 to P_CCM_s−1, sourceTermSet0 is not used, and biasTerm refers to another one tap as midValue.

Each or any subset of P_CCM_0(i, j) to P_CCM_s−1(i, j) is the predicted sample from the mode which is selected from all or any subset of the candidate cross-component prediction modes for the coding mode. For example, P_CCM_0(i, j) is the predicted sample from the first mode. For example, P_CCM_s−1(i, j) is the predicted sample from the s-th mode (or (s−1)-th mode if the first mode is 0th mode).

In one embodiment, s is set as at least two. For an example of s being 2, when the coding mode is CCM, one predictor from CCM_0 and the other predictor from CCM_1 are used for generating the final predictor. In one sub-embodiment, the CCM_0 is indicated by a mode index and CCM_1 is derived by TIMD derivation process. That is, CCM_0 is selected depending on the signalled chroma prediction mode index and CCM_1 is the mode which has the smallest TIMD cost (among a pre-defined set of candidate CCMs) on the reference region (template) of the current block. For example, the pre-defined set of candidate CCMs for CCM includes MMLM_L, MMLM_T, and/or MMLM_LT. For another example, CCM_0 is one from CCLM_L, CCLM_T, and CCLM_LT.

In another embodiment, the proposed mechanism is treated as an optional mode (for example, an optional mode of CCM coded block). That is, a flag is signalled/parsed at the encoder/decoder to indicate whether to use the proposed mechanism for the current block. In one sub-embodiment, the flag is at block-level, CTU-level, slice-level, SPS-level, tile-level, PPS-level, and/or picture-level. In another embodiment, the flag is context-coded. For example, only one context is used for signalling the flag. For another example, the context selection of the flag depends on the coding information, block width, block height, and/or block area of the current block and/or the coding information, block width, block height, and/or block area of the neighbouring block.

In another embodiment, the proposed mechanism is a replacement method. When generating the predictors of the current CCM coded block with supporting the proposed mechanism, the generation of the predictor is inferred to follow the proposed mechanisms.

In another embodiment, s here is a pre-defined value. For example, s=1, 2, 3, or any positive integer. In one sub-embodiment, s is fixed at the pre-defined value in the standard. In another sub-embodiment, s is adaptive according to the coding information, block width, block height, and/or block area of the current block and/or the coding information, block width, block height, and/or block area of the neighbouring block. For example, if the block width height, or area is larger than a pre-defined threshold, s is a larger number; otherwise, s is a smaller number.

In another embodiment, when using the regression method to derive the model parameters on the reference region of the current block, the to-be-minimized distortion is between the combining resulting, including (1) predictors generated from the mode 0 to s−1 on the reference region of the current block, (2) bias and (3) weighting setting, and the reconstructed samples on the reference region of the current block.

In another embodiment, sourceTermSet0 can be used in the expression. That is, the corresponding luma information can be used to generate the target chroma samples. For example, $rec_L'(i,j)$, G(i, j), and/or Gy(i, j), Gx(i, j) are added as the source terms in sourceTermSet0.

$$pred_C(i, j) = \alpha_0 \cdot \text{Ppat\_0}(i, j) + \qquad \qquad \text{IV.2.6}$$
$$\alpha_1 \cdot \text{Ppat\_1}(i, j) + \ldots + \alpha_{s-1} \cdot \text{Ppat\_s} - 1(i, j) + \alpha_s \cdot \text{bias}$$

In this expression of the target sample being chroma for a CCM coded block, source TermSet1 includes s taps as Ppat_0 to Ppat_s−1, sourceTermSet0 is not used, and biasTerm refers to another one tap as midValue.

Each or any subset of Ppat_0(i, j) to Ppat_s−1(i, j) is the combined predicted sample following the rule of the CCM coding tool for the current block. For an example of the CCM coding tool being TIMD-CCM, the combined predicted sample is formed by a TIMD-CCM weighted average of each predictor generated from a TIMD-CCM to-be-blended prediction mode. 0 to s−1 indicate the s-tap pattern (any pre-defined pattern in the Section I or II) of the source terms. An example of TIMD-CCM weighted average is shown in the following.

In one case, both of the two to-be-blended CCMs are selected by one or more signalled mode indices. In another case, only one of the two to-be-blended CCMs is selected by a signalled mode index and the other of the two to-be-blended CCMs is determined by the TIMD derivation process. The TIMD derivation process means for each of all candidate CCMs for the other of the two to-be-blended CCMs, a TIMD cost (or called as a template cost) is calculated on the template by comparing the distortion between the reconstructed samples of the template and the predicted samples of the template, and the candidate CCM with the smallest TIMD cost is determined as the other of the two to-be-blended CCMs, where the predicted samples of the template are generated by The models of the current candidate CCM are derived with the inputs as (1) the reference region of the template for the current chroma block and (2) the reference region of the template for the collocated luma block.

The derived models of the current candidate CCM will be applied to the reconstructed samples in the template of the collocated luma block to get the predicted samples of the template of the current (chroma) block.

In another case, both of the two to-be-blended CCM are determined by the TIMD derivation process. After deciding the two to-be-blended CCMs, the weighting for the two to-be-blended CCMs depends on the TIMD costs of the two to-be-blended CCM. The mode with a smaller TIMD cost gets a higher weight when doing TIMD-CCM (or named as template-based-CCM) weighted average.

In one embodiment, the proposed mechanism is treated as an optional mode (for example, an optional mode of TIMD-CCM). That is, a flag is signalled/parsed at encoder/decoder to indicate whether to use the proposed mechanism for the current block (coded by TIMD-CCM). In one sub-embodiment, the flag is at block-level, CTU-level, slice-level, SPS-level, tile-level, PPS-level, and/or picture-level. In another embodiment, the flag is context-coded. For example, only one context is used for signalling the flag. For another example, the context selection of the flag depends on the coding information, block width, block height, and/or block area of the current block and/or the coding information, block width, block height, and/or block area of the neighbouring block.

In another embodiment, the proposed mechanism is a replacement method. When generating the predictors of the current TIMD-CCM-coded block with supporting the proposed mechanism, the generation of the predictor is inferred to follow the proposed mechanisms.

In another embodiment, s here is a pre-defined value. For example, s=1, 2, 3, or any positive integer. In one sub-embodiment, s is fixed at the pre-defined value in the standard. In another sub-embodiment, s is adaptive according to the coding information, block width, block height, and/or block area of the current block and/or the coding information, block width, block height, and/or block area of the neighbouring block. For example, if the block width height, or area is larger than a pre-defined threshold, s is a larger number; otherwise, s is a smaller number.

In another embodiment, when using the regression method to derive the model parameters on the reference region of the current block, the to-be-minimized distortion is between the combining resulting, including (1) combining predictors generated from the pattern tap 0 to s−1 of the reference region of the current block, (2) bias and (3) weighting setting, and the reconstructed samples of the reference region of the current block.

In another embodiment, sourceTermSet0 can be used in the expression. That is, the corresponding luma information can be used to generate the target chroma samples.

In another embodiment, the wording "TIMD-CCM" can be replaced with any cross-component tools, which use multiple hypotheses of predictions from multiple CCM models to form the final prediction, to apply the proposed mechanism when the current block uses the certain coding tool.

In another embodiment, when generating the target predictors of the current block and/or generating the template predictors on the reference region of the current block, a long-tap post-filter is applied. The filtering shape can be any pattern proposed in the above invention.

The proposed methods in this invention can be enabled and/or disabled according to implicit rules (e.g. block width, height, or area) or according to explicit rules (e.g. syntax on block, tile, slice, picture, SPS, or PPS level). For example, the proposed method is applied when the block area is smaller/larger than a threshold.

The term "block" in this invention can refer to TU/TB, CU/CB, PU/PB, pre-defined region, or CTU/CTB.

Figure 1B:
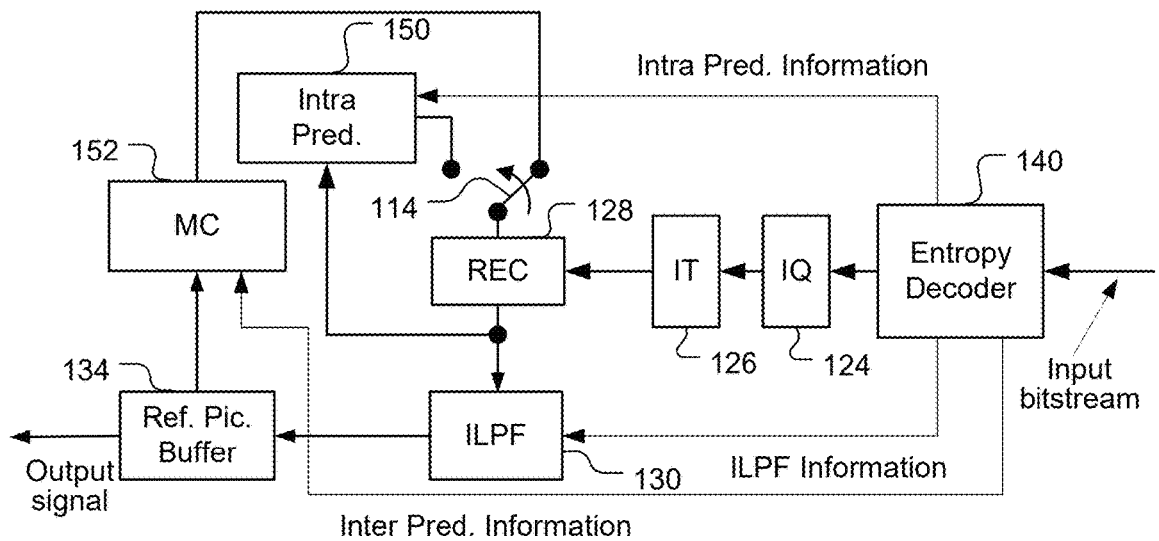
FIG. 1B illustrates a corresponding decoder for the encoder in FIG. 1A.
Figure 2A:
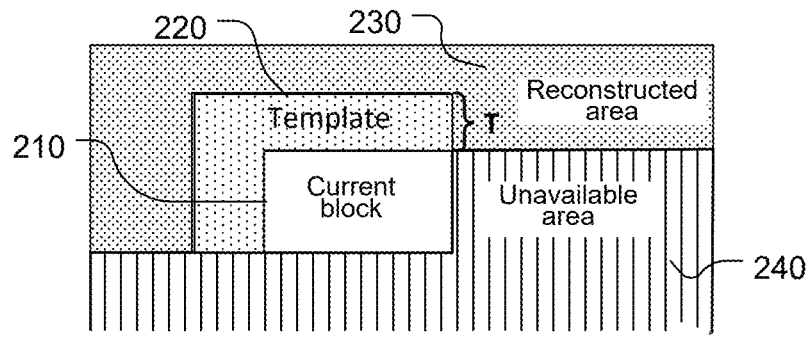
FIG. 2A illustrates an example of selected template for a current block, where the template comprises T lines above the current block and T columns to the left of the current block.
Figure 2B:
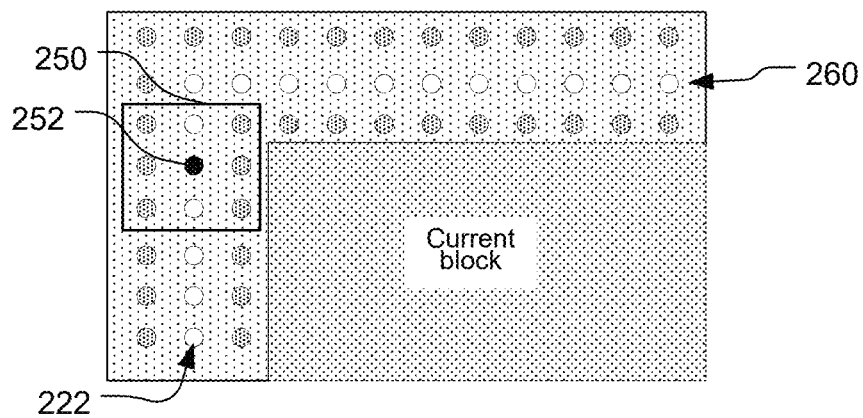
FIG. 2B illustrates an example for T=3 and the HoGs (Histogram of Gradient) are calculated for pixels in the middle row and pixels in the middle column.
Figure 2C:
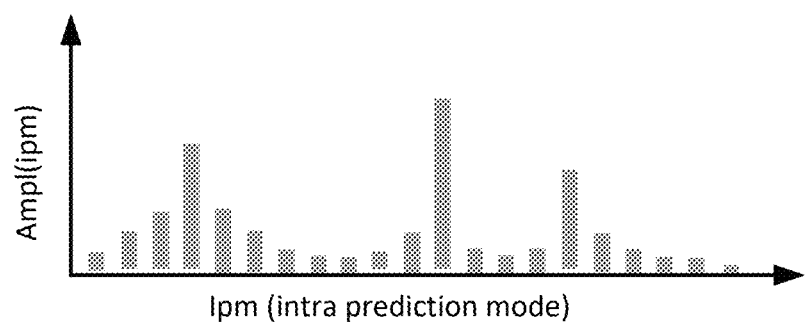
FIG. 2C illustrates an example of the amplitudes (ampl) for the angular intra prediction modes.
Figure 3:
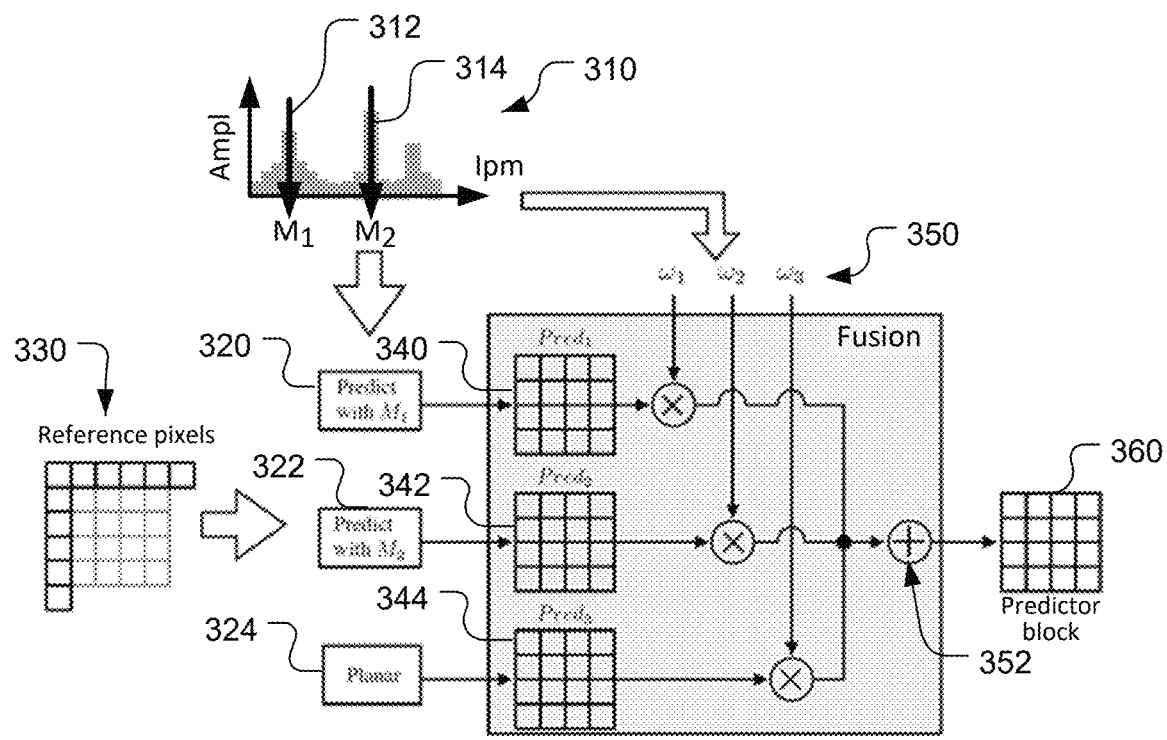
FIG. 3 illustrates an example of the blending process, where two angular intra modes (M1 and M2) are selected according to the indices with two tallest bars of histogram bars.
Figure 4:
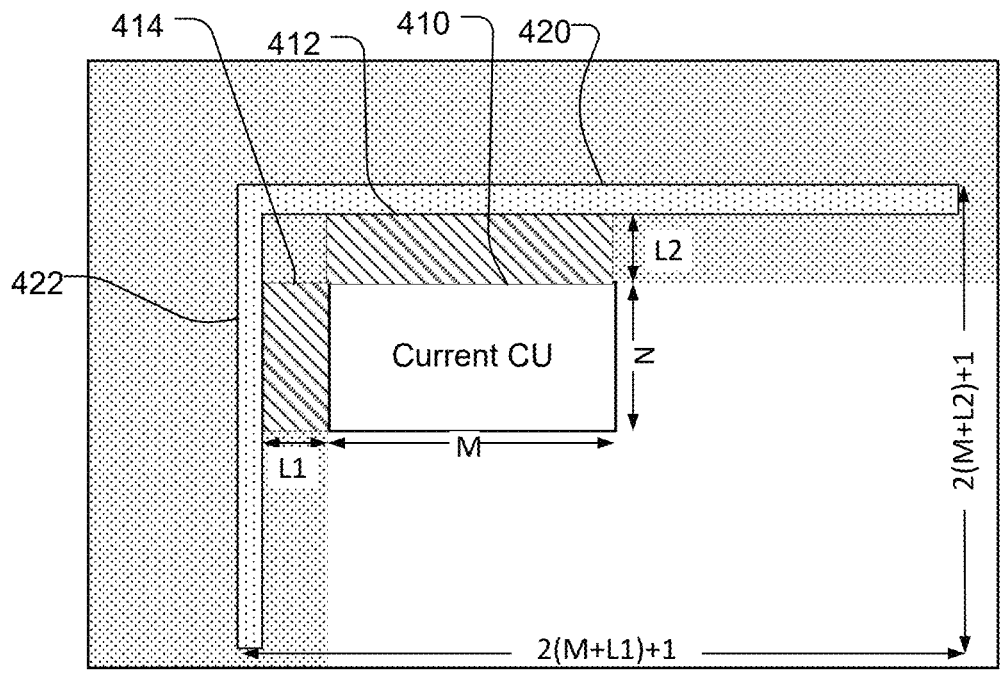
FIG. 4 illustrates an example of template-based intra mode derivation (TIMD) mode, where TIMD implicitly derives the intra prediction mode of a CU using a neighbouring template at both the encoder and decoder.

Any combination of the proposed regression-based combined prediction methods in this invention can be applied. In one embodiment, for chroma, when using the proposed mechanism, more primary transform candidates are allowed. Any of the foregoing proposed regression-based combined prediction methods can be implemented in encoders and/or decoders. For example, any of the proposed methods can be implemented in an inter/intra/IBC/prediction/transform module (e.g. Intra Pred. 110/Inter Pred. 112 in FIG. 1A) of an encoder, and/or an inter/intra/IBC/prediction/transform module (e.g. Intra Pred. 150/MC 152 in FIG. 1B) of a decoder. Alternatively, any of the proposed methods can be implemented as a circuit coupled to the inter/intra/IBC/prediction/transform module of the encoder and/or the inter/intra/IBC/prediction/transform module of the decoder, so as to provide the information needed by the inter/intra/IBC/prediction/transform module.

Figure 13:
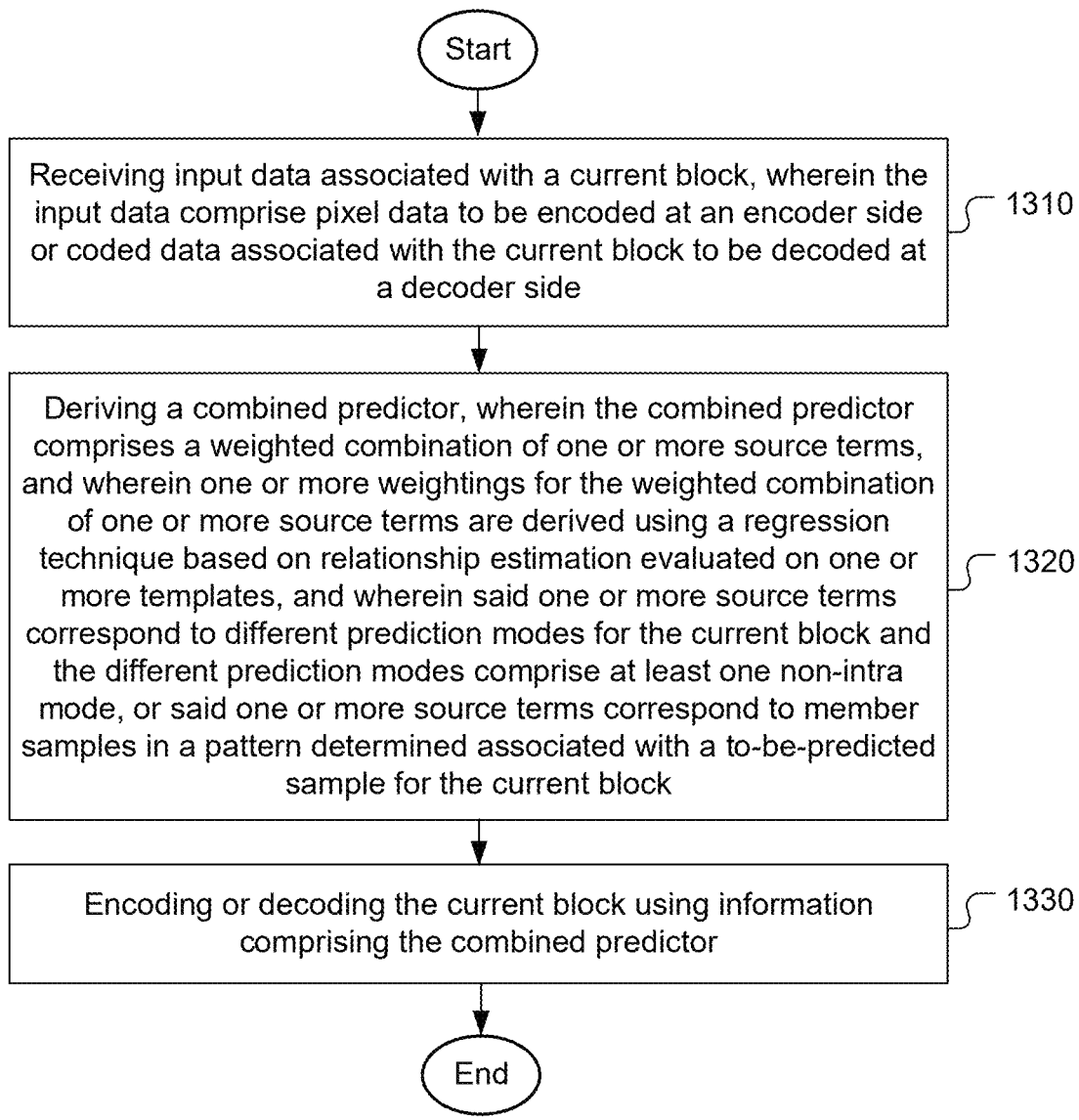
FIG. 13 illustrates a flowchart of an exemplary video coding system that derives combined prediction based on template-regression based techniques according to an embodiment of the present invention.

FIG. 13 illustrates a flowchart of an exemplary video coding system that derives combined prediction based on template-regression based techniques according to an embodiment of the present invention. The steps shown in the flowchart may be implemented as program codes executable on one or more processors (e.g., one or more CPUs) at the encoder side and/or decoder side. The steps shown in the flowchart may also be implemented based hardware such as one or more electronic devices or processors arranged to perform the steps in the flowchart. According to this method, input data associated with a current block are received in step 1310, wherein the input data comprise pixel data to be encoded at an encoder side or coded data associated with the current block to be decoded at a decoder side. A combined predictor is derived in step 1320, wherein the combined predictor comprises a weighted combination of one or more source terms, and wherein one or more weightings for the weighted combination of one or more source terms are derived using a regression technique based on relationship estimation based on one or more templates, and wherein said one or more source terms correspond to different prediction modes for the current block and the different prediction modes comprise at least one non-intra mode, or said one or more source terms correspond to member samples in a pattern determined associated with a to-be-predicted sample for the current block. The current block is encoded or decoded using information comprising the combined predictor in step 1330.

The flowchart shown is intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding, the method comprising:
   receiving input data associated with a current block, wherein the input data comprise pixel data to be encoded at an encoder side or coded data associated with the current block to be decoded at a decoder side;
   deriving a combined predictor, wherein the combined predictor comprises a weighted combination of one or more source terms, and wherein one or more weightings for the weighted combination of one or more source terms are derived using a regression technique based on relationship estimation evaluated on one or more templates, and wherein said one or more source terms correspond to different prediction modes for the current block and the different prediction modes comprise at least one non-intra mode, or said one or more source terms correspond to member samples in a pattern determined associated with a to-be-predicted sample for the current block; and
   encoding or decoding the current block using information comprising the combined predictor.

2. The method of claim 1, wherein each member sample corresponds to an initial predicted sample of combining prediction mode.

3. The method of claim 1, wherein said one or more templates comprise an above reference region of the current block, a left reference region of the current block, an above-left reference region of the current block, or a combination thereof.

4. The method of claim 1, wherein the combined predictor corresponds to a target predictor generated according to Inter and Intra Prediction (CIIP).

5. The method of claim 4, wherein each of said one or more source terms correspond to one or more predicted samples associated with an inter mode index from an inter candidate list or an intra mode index from an intra candidate list.

6. The method of claim 4, wherein said one or more source terms correspond to one or more combined predicted samples derived according to the CIIP.

7. The method of claim 1, wherein the combined predictor corresponds to a target predictor generated according to Multiple-Hypothesis Prediction (MHP).

8. The method of claim 7, wherein each of said one or more source terms correspond to one or more predicted samples associated with an inter mode index from an inter candidate list.

9. The method of claim 7, wherein said one or more source terms correspond to one or more combined predicted samples derived according to the MHP.

10. The method of claim 1, wherein the combined predictor corresponds to a target predictor generated according to Bi-prediction with CU-level Weight (BCW).

11. The method of claim 10, wherein each of said one or more source terms correspond to one or more predicted samples associated with an inter mode index from an inter candidate list.

12. The method of claim 10, wherein said one or more source terms correspond to one or more combined predicted samples derived according to the BCW.

13. The method of claim 1, wherein the regression technique corresponds to Linear Minimum Mean Square Error (LMMSE) technique.

14. The method of claim 1, wherein the regression technique corresponds to LDL decomposition technique.

15. The method of claim 1, wherein the regression technique is unified with a technique for cross-component chroma mode.

16. The method of claim 1, wherein the regression technique corresponds to Gaussian elimination technique.

17. The method of claim 1, wherein the relationship estimation corresponds to distortion between predicted samples and reconstructed samples on said one or more templates.

18. An apparatus for video coding, the apparatus comprising one or more electronics or processors arranged to:

receive input data associated with a current block, wherein the input data comprise pixel data to be encoded at an encoder side or coded data associated with the current block to be decoded at a decoder side;

derive a combined predictor, wherein the combined predictor comprises a weighted combination of one or more source terms, and wherein one or more weightings for the weighted combination of one or more source terms are derived using a regression technique based on relationship estimation evaluated on one or more templates, and wherein said one or more source terms correspond to different prediction modes for the current block and the different prediction modes comprise at least one non-intra mode, or said one or more source terms correspond to member samples in a pattern determined associated with a to-be-predicted sample for the current block; and encode or decode the current block using information comprising the combined predictor.

* * * * *